Figure 1:
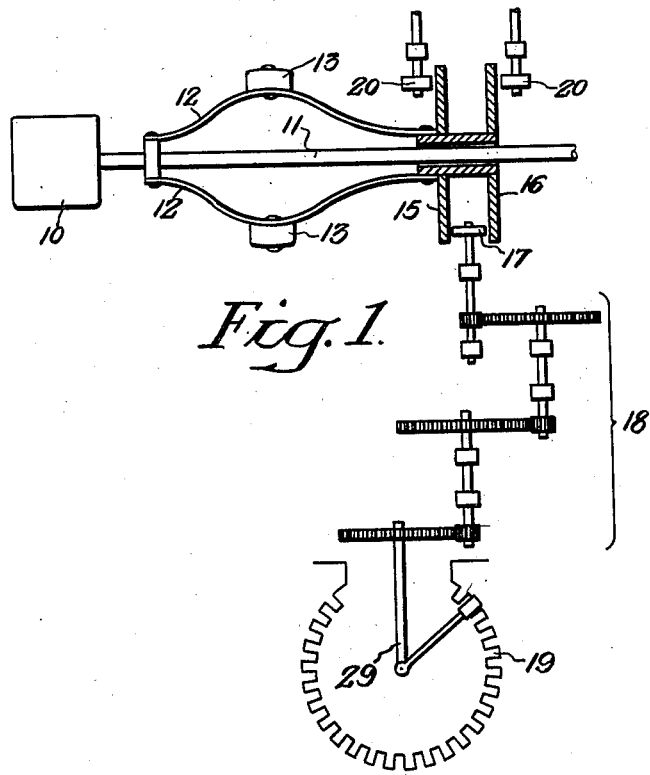

Jan. 18, 1938.  E. GERLACH  2,105,529

SPEED CONTROL SYSTEM

Filed Aug. 6, 1935

Inventor
Erwin Gerlach
By
Attorney

Patented Jan. 18, 1938

2,105,529

UNITED STATES PATENT OFFICE 2,105,529

SPEED CONTROL SYSTEM

Erwin Gerlach, Berlin-Siemensstadt, Germany, assignor to Klangfilm G. m. b. H., Berlin, Germany, a corporation of Germany Application August 6, 1935, Serial No. 34,929
In Germany September 7, 1934

3 Claims. (Cl. 188—187)

This invention relates to speed control systems such as are utilized in connection with sound recording and reproducing apparatus, and has for its principal object the provision of an improved apparatus and method of operation whereby means are operated in response to the driving speed of the apparatus to prevent substantial variation in this speed.

Arrangements of this kind have been so designed that a frictional brake is applied to the drive shaft in response to variations in the speed of rotation or according to the position of centrifugal weights. It has been found, however, that the brake blocks or shoes which are normally made of felt, are subject to a certain wear and tear which makes it difficult to maintain the rotational speed sufficiently constant, especially when slow variations are to be avoided.

According to this invention, an arrangement comprising centrifugal governor weights is so designed that it operates only to produce a regulator action and remains at rest when speed of rotation is constant.

The invention will be better understood from the following description when considered in connection with the accompanying drawing, and its scope will be pointed out in the appended claims.

Figure 2:
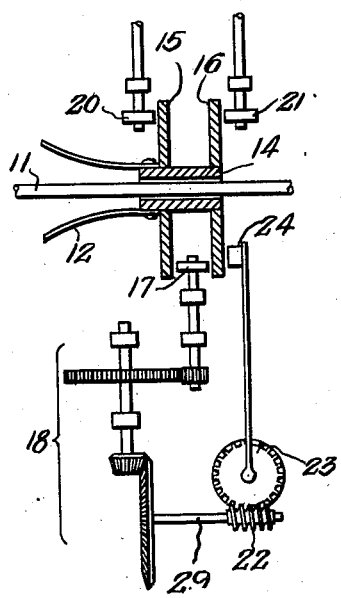
Figure 3:
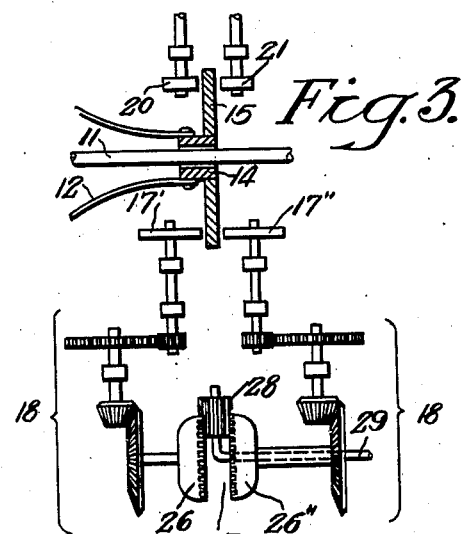

Referring to the drawing,

Fig. 1 illustrates an embodiment of the invention wherein a centrifugal mechanism operated in response to variation in driving speed is utilized to regulate the speed of the drive motor, Fig. 2 illustrates a modification wherein the regulation is effected through variation in the pressure of the brake, and Fig. 3 illustrates a further modification which is applicable either to regulate the speed of the prime mover or to vary the pressure of the brake.

Referring to Fig. 1, 10 is an electric motor driving shaft or spindle 11 to which centrifugal weights 13 are attached through springs 12. In this arrangement the springs 12 are connected at their left-hand ends to a collar fixed on the spindle 11 and at their right-hand end are attached to a sleeve 14 shiftable along the spindle 11. With this sleeve 14 are rigidly connected two disks 15 and 16 which are spaced apart a slightly greater distance than the diameter of a tiny wheel 17. When the speed of rotation of spindle 11 varies above or below the rated or nominal value, the small wheel 17 is caused to revolve in one direction or the other, and by way of a step-down gear 18 adjusts a resistance 19 which in known manner is included in the field or armature circuit of the motor 10. The distance between the circumference of the wheel 17 and the two disks 15 and 16 may be reduced in practice to as small a value as 0.05 mm. so that the governor device will be caused to respond even in the presence of extremely slight departures from the normal speed. In the known arrangements, a far greater shift of the sleeve 14 along the spindle 11 is required to obtain any appreciable change in the pressure of the felt brake shoes.

The axis of the small wheel 17 or the journaling thereof is preferably made slightly elastic in order that unduly great mechanical load or stress of this axis may not be occasioned. There may be further provided two rolls 20 and 21 which act as stops.

Another embodiment which is suited for the drive of the talking machine by means of a spring motor is shown in Fig. 2. This embodiment differs from that in Fig. 1 in that, on the part of the wheel 17 and a step-down gear (not shown) and a worm 22 as well as a worm wheel 23 the pressure of a brake shoe 24 made of felt or the like is altered. According to this embodiment, the sleeve 14 has to be changed in position in the direction of spindle 11 only the small amount which will suffice to cause actuation of the wheel 17, whereas in the forms of construction known in the past required a shift which caused an appreciable change in frictional action of the brake shoes. The change in the frictional effect which, of course, in the embodiment Fig. 2 is likewise necessary, is here insured by an adjustment of the brake block 24.

The third embodiment shown in Fig. 3 differs from that of Fig. 1 in that a disk 15 is secured upon the sleeve 14 between two small wheels 17' and 17" which are capable of being actuated by the wheel 15 and operate through the intermediary of a step-down gear upon wheels 26' and 26" of a differential gear 27. The planetary wheel 28 of this gear and thus the output spindle 29, according to the departure from the rated speed of rotation, will be shifted in one sense or the other, and thereby will work on a resistance 19 as shown in Fig. 1 or a brake-shoe 24, as in Fig. 2.

I claim:

1. The combination of a driven shaft, a pair of members rotatable with and slidable along said shaft, a brake including a brake shoe arranged to cooperate with one of said members, a roller interposed between said members and connected to said brake for controlling the pressure of said brake on said members and means connecting said roller and said brake.

2. The combination of a driven shaft, a pair of centrifugally-controlled members rotatable with and slidable along said shaft, a brake including a brake shoe arranged to cooperate with one of said members, a roller interposed between said members and connected to said brake for controlling the pressure of said brake on said members and means connecting said roller and said brake.

3. The combination of a driven shaft, a pair of members rotatable with and slidable along said shaft, a pivoted brake including a brake shoe arranged to cooperate with one of said members, a roller interposed between said members and connected to said brake for controlling the pressure of said brake on said members and means connecting said roller and said brake for moving said brake on its pivot.

ERWIN GERLACH.